(12) United States Patent
Inzirillo et al.

(10) Patent No.: US 11,900,459 B2
(45) Date of Patent: *Feb. 13, 2024

(54) RANDOMIZED AUCTION NOTIFICATION (71) Applicant: Cboe Exchange, Inc., Chicago, IL (US)

(72) Inventors: Adam Inzirillo, Bay Shore, NY (US); William Ciabattoni, New York, NY (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,319

(22) Filed: Jan. 30, 2023

(65) Prior Publication Data
US 2023/0177608 A1    Jun. 8, 2023

Related U.S. Application Data

(63) Continuation of application No. 17/188,525, filed on Mar. 1, 2021, now Pat. No. 11,568,488.

(60) Provisional application No. 62/983,320, filed on Feb. 28, 2020, provisional application No. 62/983,289, filed on Feb. 28, 2020.

(51) Int. Cl.
*G06Q 40/04* (2012.01)
*G06F 9/54* (2006.01)
*G06F 7/58* (2006.01)

(52) U.S. Cl.
CPC .............. *G06Q 40/04* (2013.01); *G06F 7/582* (2013.01); *G06F 9/542* (2013.01)

(58) Field of Classification Search
None
See application file for complete search history.

(56) References Cited

U.S. PATENT DOCUMENTS

| 7,428,506 B2 | 9/2008 | Waelbroeck |
| 7,873,561 B1 | 1/2011 | Adcock et al. |
| 7,921,054 B2 | 4/2011 | Balabon |
| 8,010,415 B2 | 8/2011 | Friedland et al. |

(Continued)

FOREIGN PATENT DOCUMENTS

WO    WO 2010085746    7/2010

OTHER PUBLICATIONS

"Nick Baker and Bryan Gruley, The Gazillion-Dollar Standoff Over Two High-Frequency Trading Towers, Bloomberg, Mar. 8, 2019" (Year: 2019).*

(Continued)

*Primary Examiner* — Kito R Robinson
*Assistant Examiner* — Toan Duc Bui
(74) *Attorney, Agent, or Firm* — Fish & Richardson P.C.

(57) ABSTRACT

A method for performing an auction implemented via an exchange computer system includes receiving, from a user device, a security transaction order, receiving a first matching order, initiating a delay timer that runs for a first period of time, initiating an auction timer that runs for a second period of time, determining that the first period of time has expired, notifying a plurality of market participants of an auction, receiving, during the second period of time, one or more additional matching orders, wherein each of the one or more additional matching orders includes a request for participation in the auction, determining that the second period of time has expired, and facilitating a transaction based on the security transaction order.

20 Claims, 3 Drawing Sheets

(56) References Cited

U.S. PATENT DOCUMENTS

| | | | |
|---|---|---|---|
| 8,108,299 B1 | 1/2012 | Waelbroeck et al. | |
| 8,200,568 B2 | 6/2012 | Renton et al. | |
| 8,266,045 B2 * | 9/2012 | Waelbroeck | G06Q 40/04 705/37 |
| 8,271,375 B2 | 9/2012 | Mahoney et al. | |
| 8,380,610 B1 | 2/2013 | Nagle et al. | |
| 8,442,859 B1 | 5/2013 | Broms et al. | |
| 8,620,759 B1 | 12/2013 | Virgilio et al. | |
| 9,953,365 B2 | 4/2018 | Friedman | |
| 10,269,067 B2 | 4/2019 | Suminski et al. | |
| 10,304,132 B2 * | 5/2019 | Suminski | G06Q 40/04 |
| 10,417,698 B2 * | 9/2019 | Tisler | G06Q 30/08 |
| 10,614,801 B2 * | 4/2020 | Filev | G10L 15/1822 |
| 11,023,971 B2 | 6/2021 | Lutnick et al. | |
| 11,030,689 B2 | 6/2021 | Suminski et al. | |
| 11,170,442 B2 | 11/2021 | Suminski et al. | |
| 2006/0026090 A1 | 2/2006 | Balabon | |
| 2006/0031157 A1 | 2/2006 | Gianakouros et al. | |
| 2006/0259391 A1 | 11/2006 | Schoen et al. | |
| 2008/0015974 A1 | 1/2008 | Balabon | |
| 2008/0259391 A1 | 10/2008 | Maruo et al. | |
| 2008/0306864 A1 | 12/2008 | Foley et al. | |
| 2009/0024512 A1 | 1/2009 | Reid | |
| 2009/0070250 A1 | 3/2009 | Adcock et al. | |
| 2009/0144187 A1 | 6/2009 | Borkovec et al. | |
| 2009/0210337 A1 | 8/2009 | Mahoney et al. | |
| 2009/0259584 A1 | 10/2009 | Waelbroeck et al. | |
| 2010/0076886 A1 | 3/2010 | Adams et al. | |
| 2010/0174654 A1 | 7/2010 | Foley et al. | |
| 2012/0022994 A1 | 1/2012 | Conary et al. | |
| 2012/0078775 A1 | 3/2012 | Callahan | |
| 2012/0246005 A1 | 9/2012 | Horstemeyer | |
| 2013/0006828 A1 | 1/2013 | Dale et al. | |
| 2013/0013487 A1 | 1/2013 | Sellberg et al. | |
| 2014/0136395 A1 | 5/2014 | Dowling | |
| 2014/0149273 A1 | 5/2014 | Angell et al. | |
| 2014/0188688 A1 | 7/2014 | Crutchfield et al. | |
| 2015/0095209 A1 | 4/2015 | Adcock et al. | |
| 2015/0356678 A1 | 12/2015 | Schmitt | |

OTHER PUBLICATIONS

"Evan Soltas, Confused about high-frequency trading? Here's a guide, Apr. 15, 2014" (Year: 2014).*

Baker, "The Gazillion-Dollar Standoff Over Two High-Frequency Trading Towers," Bloomberg, Mar. 8, 2019, 16 pages.

International Preliminary Report on Patentability in International Appln. No. PCT/US2021/020288, dated Sep. 9, 2022, 11 pages.

Jeffs [online], "Dark Pools of Liquidity Come Into the Light," Financial News, Oct. 1, 2007, retrieved on Aug. 23, 2022, retrieved from UR: <https://www.fnlondon.com/articles/dark-pools-of-liquidity-come-into-the-light-20071001>, 9 pages.

Johnson, "Regulating Innovation: High Frequency Trading in Dark Pools," Journal of Corporation Law, 42(2), Oct. 2017, 54 pages.

PCT International Search Report and Written Opinion in International Appln. No. PCT/US2021/020288, dated Jun. 15, 2021, 13 pages.

Wallman, "Technology Takes to Securities Trading," IEEE Spectrum, Feb. 1997, 34(2):60-65.

Chaves and Ichihashi, "Auction Timing and Market Thickness," Available at SSRN 2852034, Mar. 1, 2019, 13-24, 47 pages.

* cited by examiner

RANDOMIZED AUCTION NOTIFICATION

CROSS-REFERENCE TO RELATED APPLICATIONS

This patent application is a continuation (and claims the benefit of priority under 35 USC 120) of U.S. patent application Ser. No. 17/188,525, filed Mar. 1, 2021, which claims the benefit of U.S. Provisional Patent Application No. 62/983,289, filed Feb. 28, 2020, and U.S. Provisional Patent Application No. 62/983,320, filed Feb. 28, 2020, each of which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO) (also known as first-come-first-served (FCFS)).

Within trading environments such as these, some market participants have sought advantage over others through the use of sophisticated computer algorithms that can analyze market conditions and react to changes by placing large volumes of orders at relatively high speeds—typically, within fractions of a second of a detected change. Such traders also often invest large sums in cutting-edge computer systems that can process and send orders at the highest possible speed. Similarly, traders invest significant resources on the fastest network connections and place their computers as close to the exchange as possible to reduce all possible communications latency between their computers and the exchange. Not all traders have access to these resources, which command massive capital to obtain; accordingly, where there is an objective not to reward the traders with the fastest algorithms, computers, and network connections, there is a need for technology that reduces the advantages possessed by some traders over others.

SUMMARY

The disclosure that follows relates to on-demand auctions implemented via an exchange computer system. The disclosed technology enables market participants to opt in to a system that minimizes the advantages enjoyed by certain traders simply because of their possession of technology that allows them to send orders to the exchange faster than other traders.

In one aspect, a method for performing an auction implemented via an exchange computer system includes receiving, from a user device, a security transaction order that includes an auction request. The method includes receiving a first matching order, initiating a delay timer that runs for a first period of time, and initiating an auction timer that runs for a second period of time, where a length of the second period of time is predetermined. The method includes determining that the first period of time has expired, notifying a plurality of market participants of an auction, and receiving, during the second period of time, one or more additional matching orders, where each of the one or more additional matching orders includes a request for participation in the auction. The method includes determining that the second period of time has expired and facilitating, by one or more processors, a transaction based on the security transaction order.

The delay timer that runs for a first period of time can be initiated in response to receiving the security transaction order. Alternatively, the delay timer that runs for a first period of time can be initiated in response to receiving the first matching order.

The method can include determining a length of the first period of time based on a pseudorandom process, a trading day, and/or one or more parameters associated with the security transaction order. At least a portion of the second period of time may occur during the first period of time.

In some implementations, facilitating a transaction based on the security transaction order can include identifying a price of the first matching order, identifying a price of each of the one or more additional matching orders received during the second period of time, selecting a matching order based on price, and executing the transaction based on the security transaction order and the selected matching order.

In some implementations, the exchange computer system is a distributed computer system that includes an order routing system, an order matching system, and an auction engine.

Certain implementations may provide various advantages. For example, the implementation of on-demand auction via an exchange computer system deemphasizes the importance of order entry speed in trading, thereby promoting fairness. In a continuous trading format, if one user's order arrives after another's, even if only by a fraction of a second, the late-arriving order may never execute, or may execute at a worse price. By conducting an auction that allows orders to accumulate during a period of time, as opposed to continuously trading, the system can ensure that the best-priced orders received during the period trade; not necessarily the orders that were first to arrive. By enabling users to opt in to an auction system on an order-by-order basis, the system provides a means for users to protect themselves against technology advantages possessed by others.

Users of complex trading algorithms might attempt to retain their advantages by tuning their algorithms based on predicted auction start times and lengths. As such, in some implementations, the system introduces unpredictability by delaying auction start times, randomizing auction start notifications, randomizing auction lengths, and/or introducing delays between periodic auctions.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
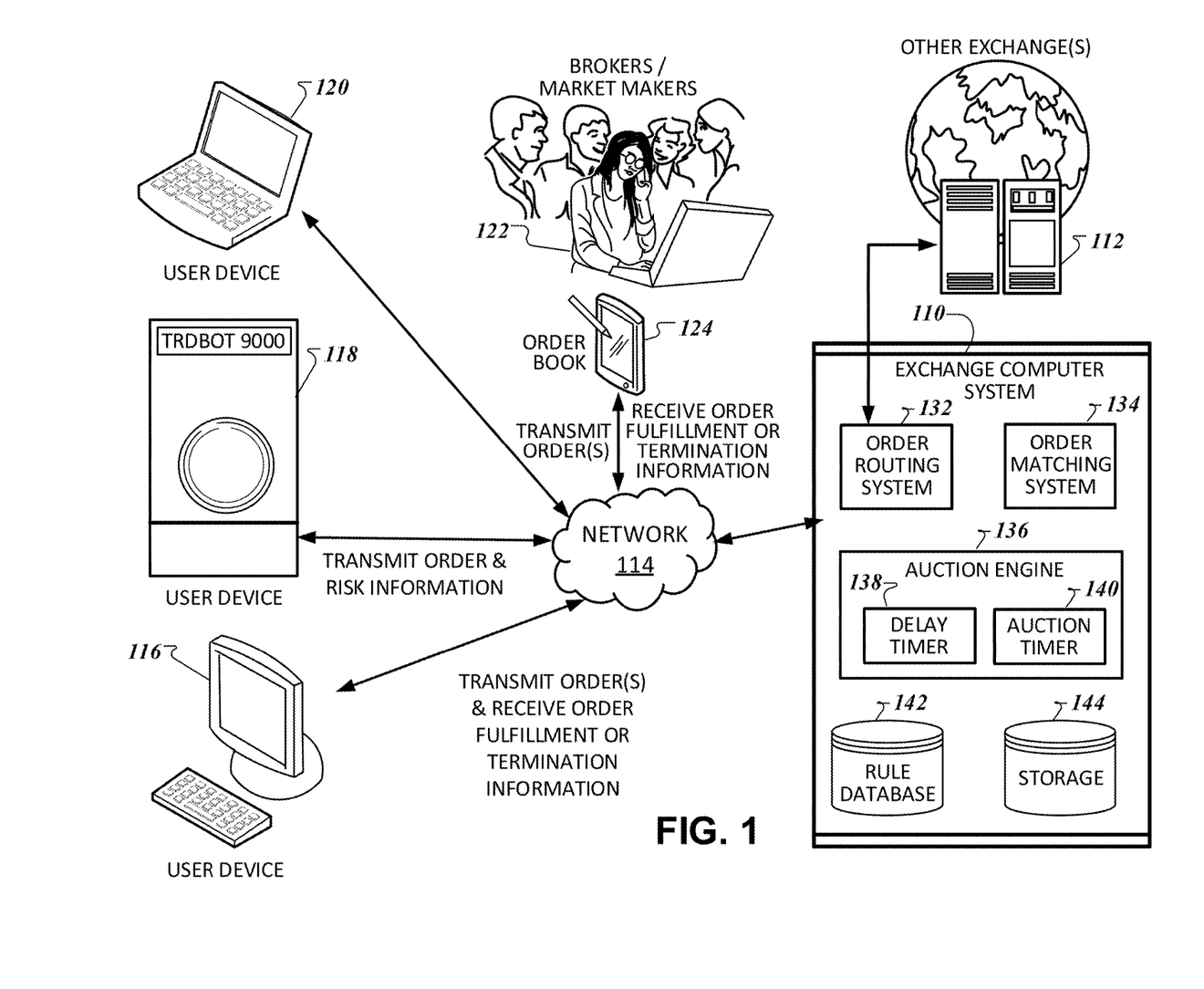
FIG. 1 is a diagram of an exchange computer system and associated networks, devices, and users.

FIG. 1 is a diagram of an exchange computer system and the associated networks, devices, and users that make up an exemplary trading environment in which that system operates. Generally, the term "user" may refer to any entity that interacts with the exchange computer system and/or associated networks and devices. Users may include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures, or other derivatives associated with an underlying asset.

Network 114 connects the various components within the trading environment, and is configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may be remote from the exchange computer system 110, and may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, an auction engine 136, a database of trading rules and algorithms 142, and storage 144. In some implementations, the exchange computer system 110 is a distributed computer system. The auction engine 136 may, for example, be separate from the OMS 134 and may interact with OMS 134 to facilitate trades. In other implementations, the OMS 134 and the auction engine 136 may be the same component of exchange computer system 110.

The order routing system (ORS) 132 determines whether a received order or quote is to be executed at the exchange computer system 110, or should instead be redirected to another exchange 112, and includes processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 includes processing systems that analyze and manipulate orders according to matching rules stored in the database 142. The OMS 134 may also include an electronic book (EBOOK) of orders and quotes with which incoming orders to buy or sell are matched, according to the matching rules. The EBOOK may also be implemented in a separate database such as storage 144, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The order matching system 134 may match orders based on priority determined through a variety of order priority rules. One such rule that is commonly implemented in electronic and hybrid exchanges is a first-come-first-served rule that gives priority to orders that are received by the exchange first in time, over orders that are received later in time.

The widespread implementation of the first-come-first-served rule has led some traders to seek advantage over others through the use of sophisticated computer algorithms that can analyze market conditions and react to changes by placing large volumes of orders at relatively high speeds—typically, within fractions of a second of a detected change.

Similarly, some traders invest significant resources on cutting-edge computer systems that process and send orders at high speed, and on fast network connections that reduce communications latency between their computers and the exchange(s) on which they trade. In at least these ways, some traders leverage technological advantages that are not available to others, to ensure that their orders are received earlier in time, and are therefore systematically advantaged by the first-come-first-served rule.

To reduce the impact of these technological advantages and promote fairness, the exchange computer system 110 implements an auction engine 136 that is part of, or that interacts with, the OMS 134 to facilitate processes for the trading of financial instruments that deemphasize the importance of order entry speed. Auction engine 136 may, for example, conduct auctions in which orders accumulate during a period of time, as opposed to continuously trading, so as to ensure that the best-priced orders received during the period trade; not necessarily the orders that were received first. By enabling users to opt in to auctions on an order-by-order basis, the system provides a means for market participants to protect themselves against technological advantages possessed by others.

An auction-based trading format may, for example, be particularly desirable for traders who participate in the market via remote user devices that are physically distant from the exchange. Indeed, for remote device users in a continuous trading format, network latency is a serious concern. For example, the delay involved between the sending of an order and its receipt by the exchange, even if only a fraction of a second in length, may cause the delayed order to never execute, or to execute at a worse price. Auction engine 136 solves this and other problems by enabling remote device users to opt in to a trading format in which network latency plays little or no role in determining which orders execute.

Further, because algorithmic traders might attempt to retain their advantages by tuning their algorithms based on predicted auction start times and lengths, some implementations of auction engine 136 may also introduce unpredictability by varying the conditions in which auctions begin, delaying auction start times, randomizing auction start notifications, randomizing auction lengths, and/or introducing delays between periodic auctions.

The auction engine 136 may be implemented using a combination of software and hardware. The auction engine 136 may, for example, be implemented as one or more hardware processors configured to execute one or more algorithms, as described in further detail below.

The auction engine 136 may facilitate on-demand auctions involving orders received by ORS 132, and may work with OMS 134 to match orders for execution based on the facilitated auctions. The facilitated auctions may or may not occur periodically. The auction engine 136 may, for example, receive an order (e.g., a buy order for a security) that includes an auction request. Upon receipt of a matching order of an opposite type (e.g., a sell order for the same security), the auction engine 136 may immediately initiate an auction, or may instead initiate an auction following a period of delay. Orders for the security may accumulate during the auction's bidding period, and at the end of the period the auction engine 136 may execute a transaction based on the order that included the auction request, the matching order, and the orders that were received during the auction bidding period. As described above, the auction engine 136 may, for example, ensure that the best-priced orders received during the auction's bidding period trade; these best-priced orders may not necessarily be the orders that were received by the exchange computer system first in time.

The auction engine 136 can receive and accept various types of orders, and can receive and accept various types of additional trading instructions. The instructions can include parameters used by the auction engine 136 to execute auctions. Parameters can include, for example, order type, price, size, and duration (a length of time for which an order is valid).

The auction engine 136 may include a delay timer 138 that runs for a period of time that may be fixed or variable, so as to implement a period of delay between the receipt of an order including an auction request and the start of the auction. Alternatively, the delay timer 138 may be used to implement a period of delay between a first matching order and the start of the auction. The auction engine 136 may also use the delay timer 138 to implement periodic auctions with randomized delays between each auction.

The auction engine 136 may also include an auction timer 140 that runs for a period of time that may be fixed or variable. The period of time during which bidding occurs may, for example, vary from one auction to the next.

The auction engine 136 may include a user interface in the form of an exchange account gateway through which a user can create orders. The auction engine 136 may transmit and receive associated information through network 114, to and from user devices 116, 118, 120, and 124. The exchange account gateway may, for example, be implemented through a Secure Web API and/or a dedicated user portal.

Storage 144 and database 142 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the auction engine 136. The auction engine 136 matches the buy side and sell side of a trade, and forwards the matched trade to a third party organization that verifies the proper clearance of the trade, such as the Options Clearing Corporation (OCC) where the securities may be options. The OMS 134 also formats the quote and sale update information and sends that information through an internal distribution system that refreshes display screens on the floor, in addition to submitting the information to a quote dissemination service such as, in the case of options, the Options Price Reporting Authority (OPRA).

Figure 2:
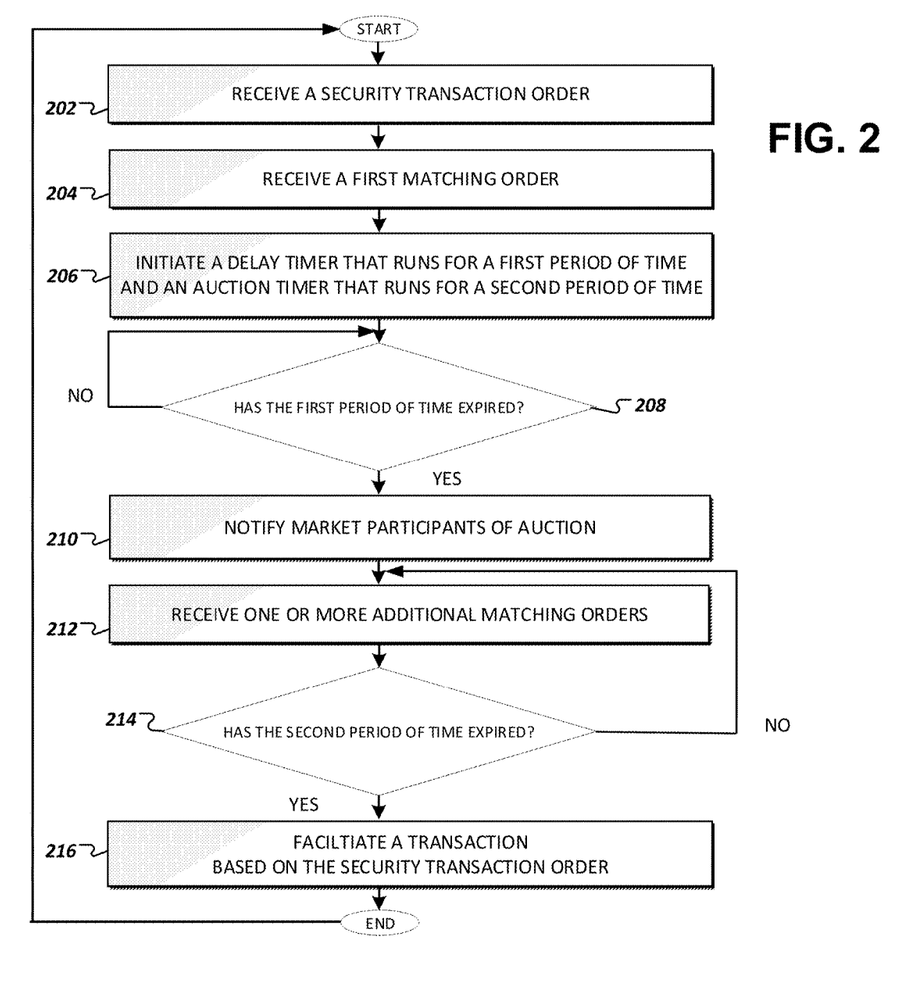
FIG. 2. is a diagram of an example process for executing an on-demand auction.

FIG. 2 is a diagram of an on-demand auction process. In more detail, FIG. 2 depicts an example of an exchange computer system executing an on-demand auction. In the depicted example, the exchange computer system 110 performs the on-demand auction process within the trading environment depicted and described in association with FIG. 1.

The process begins with step 202, in which the exchange computer system 110 receives, from a user device, a security transaction order. The exchange computer system 110 may receive, for example, a sell order for a particular financial instrument, from user device 116. In some implementations, the security transaction order includes an auction request. In some implementations, information regarding the security transaction order will be stored in order book 124 and/or storage 144.

The process continues with step 204, in which the exchange computer system 110 receives a first matching order. The exchange computer system 110 may, for example, almost immediately receive a buy order for the same financial instrument, from a user device 118 engaged in algorithmic trading. The OMS 134 can determine, based on matching rules, whether a received order matches the security transaction order. For example, the OMS 134 can determine that the buy and sell orders relate to the same financial instrument, and that the buy order price is for at least the amount of the sell order.

The process continues with step 206, in which the exchange computer system 110 initiates a delay timer 138 that runs for a first period of time, and an auction timer 140 that runs for a second period of time, which may be a fixed amount of time (e.g., a predetermined number of milliseconds). In some implementations, the auction engine 136 initiates the auction timer 140 to run for the second period of time in response to receiving the security transaction order. In other implementations, the auction engine 136 initiates the auction timer 140 to run for the second period of time in response to receiving the first matching order.

In some implementations, the first period of time may be a delay period during which no activity associated with the security transaction order occurs. In such implementations, the exchange computer system 110 may continue to receive orders during the first period of time, and may handle orders received during the first period of time outside of the auction process.

In other implementations, the exchange computer system 110 may receive one or more supplemental matching orders during the first period of time. For example, and as determined by OMS 134, the auction engine 136 may receive, from user device 116, one supplemental order that matches the security transaction order. In some examples, information associated with the security transaction order, the first matching order, and the one or more supplemental matching orders that are received during the first period of time is held in storage 144.

The first period of time can be determined using a variety of different processes (e.g., based on a pseudorandom process and/or parameters included in the security transaction order itself). In some implementations, the auction engine 136 initiates the delay timer 138 to run for the first period of time in response to receiving the security transaction order. In other implementations, the auction engine 136 initiates the delay timer 138 to run for the first period of time in response to receiving the first matching order.

The process continues with step 208, in which the exchange computer system 110 determines whether the first period of time has expired. The determination may be made based on the delay timer 138 and, if the first period of time has expired, the process will continue to step 210.

In step 210, the exchange computer system 110 notifies market participants of the existence of an auction. As part of the notification process, the exchange computer system may, for example, generate and send a message to market participants inviting their participation in the auction. The message may include information and/or instructions enabling interested market participants to flag an order for participation in the auction, or to otherwise affirmatively indicate that an order should be included in the auction. The message may also include information regarding the security transaction order, the first matching order, and the one or more supplemental matching orders.

The process continues with step 212, in which the exchange computer system 110 receives, during the second period of time, one or more additional matching orders that are flagged for participation in the auction. For example, and as determined by OMS 134, the auction engine 136 may receive, from user devices 118 and 120, two additional orders that match the security transaction order. In some examples, information associated with the security transaction order, the first matching order, and the one or more additional matching orders that are received during the second period of time is held in storage 144.

The process continues with step 214, in which the exchange computer system 110 determines whether the second period of time has expired. If the second period of time has not expired, the process continues with step 212. If the second period of time has expired, the process continues with step 216. Auction engine 136 can, for example, determine whether the second period of time has expired based on auction timer 140.

In step 216, the exchange computer system 110 facilitates a transaction based on the security transaction order. Facilitating a transaction based on the security transaction order can include selecting a matching order from among a set of matching orders. Auction engine 136 may, for example, determine a price of the first matching order and of each of the one or more additional matching orders that were received during the second period of time, and may then select a matching order based on the determined prices. The determination of price for each order may be based on information that is associated with the order. An order may, for example, include parameters such as type, price, size, and duration, and the auction engine 136 may determine the price of an order by identifying the price that was included with the order.

After selecting a matching order based on the determined prices, auction engine 136 may execute a transaction based on the selected matching order and the security transaction order.

Once the exchange computer system 110 has facilitated the transaction based on the security transaction order, the process may continue by returning to step 202. The exchange computer system 110 may, for example, receive a second security transaction order including an auction request, and auction engine 136 may facilitate a second auction based on receipt of the second security transaction order.

Figure 3:
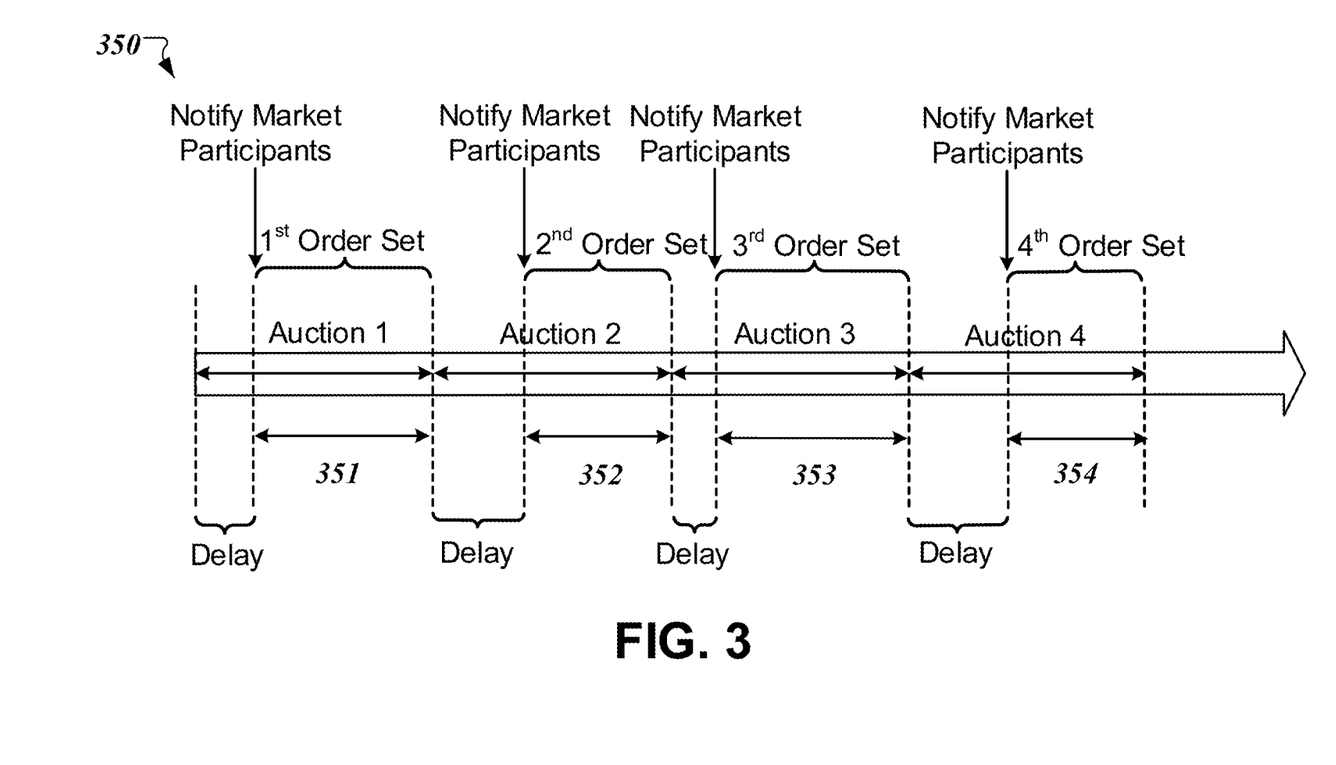
FIG. 3 is an example data flow for executing on-demand auctions.

FIG. 3 is an example data flow 350 for executing an on-demand auction in the example trading environment of FIG. 1. Operations of the data flow 350 are performed by the exchange computer system 110. In this particular example, the auction engine 136 facilitates auctions of predetermined static length, with delays of variable length between the auctions. Auction engine 136 may or may not rely on matching orders to begin delay and auction timers.

Although the auctions associated with this example are of a predetermined static length, auction engine 136 may determine the length of subsequent auctions pseudo-randomly, and/or on the basis of factors that include trading day, or order parameters such as type, price, size, or duration. The length of auctions administered by auction engine 136 may, for example, change from one trading day to the next.

The auction engine 136 administers a delay of variable length between each auction. The length of a given delay may, for example, be determined pseudorandomly, and/or on the basis of factors that include trading day, or order parameters such as type, price, size, or duration. In some instances, a delay may be of zero length.

In example data flow 350, periodic auctions run consecutively, and as soon as one auction period ends, a new auction period begins. For example, the auction engine 136 can initiate an auction timer for auction 2 as soon as an auction timer for auction 1 ends.

Offers associated with a particular auction may accumulate within the corresponding auction period. For example, during each of periods 351, 352, 353, and 354, the auction engine 136 may receive sets of orders associated with the auctions 1, 2, 3, and 4, respectively. If, for example, the auction engine 136 receives an order during one of the auction periods 351, 352, 353, or 354, the order will be considered in the corresponding auction 1, 2, 3, or 4.

As depicted in data flow 350, there are delays of different lengths prior to each of periods 351, 352, 353, and 354. The auction engine 136 may, for example, initiate a delay timer and an auction timer for auction 1 in response to receiving a first order that matches a security transaction order that included an auction request. Following the expiration of the delay, auction engine 136 may notify market participants of the existence of auction 1. Orders associated with auction 1 may accumulate within period 351 and, after that period's conclusion, auction engine 136 may facilitate a transaction based on the security transaction order, the first matching order, and any additional orders that accumulated during period 351.

In some implementations, orders associated with auction 1 may also accumulate during the delay period prior to period 351. In such implementations, the notification to market participants regarding auction 1 may include information regarding the security transaction order, the first matching order, and any supplemental orders that accumulated during the delay period prior to period 351. After period 351's conclusion, auction engine 136 may facilitate a transaction based on the security transaction order, the first matching order, any supplemental orders that accumulated during the delay period, and any additional orders that accumulated during period 351.

Although not depicted, in some implementations, auctions administered by auction engine 136 can overlap. For example, a delay timer for one auction can run while a delay timer for another auction is running, and an auction timer for one auction can run while an auction timer for another auction is running. In such implementations, exchange computer system 110 can maintain multiple sets of timers. Each auction can, for example, be associated with its own delay timer 138 and auction timer 140, such that any number of additional auctions can be run separately.

Particular implementations have been described, but other implementations are within the scope of the following claims.

We claim:

1. A method implemented via an exchange computer system for minimizing technological advantages possessed by some market participants over others by deemphasizing importance of order entry speed in trading, the method comprising:
receiving, from a user device, a security transaction order that includes an auction request for an auction;
receiving, from a first device, a first matching order that includes a request for participation in the auction, wherein the first device is configured for high-speed algorithmic trading;
determining a first randomized period of time for a delay timer based on a signal obtained by the exchange computer system;
initiating the delay timer that runs for the first randomized period of time;
determining that the first randomized period of time has expired;
responsive to determining that the first randomized period of time has expired, initiating (i) the auction associated with the security transaction order and the first matching order and (ii) an auction timer that limits the auction to run for a second period of time;
notifying a plurality of market participants of the auction;
receiving, during the second period of time, one or more additional matching orders from one or more additional devices, wherein each of the one or more additional matching orders includes a request for participation in the auction, and wherein each of the one or more additional devices are not configured for high-speed algorithmic trading;
determining that the second period of time has expired;
determining a price of the first matching order;
determining a price of each of the one or more additional matching orders received during the second period of time;
determining a best-priced matching order based on the price of the first matching order and the price of each of the one or more additional matching orders; and
facilitating, by one or more processors, a transaction based on the security transaction order and the best-priced matching order, thereby ensuring that the security transaction order trades with the best-priced matching order, and that the first device that is configured for high-speed algorithmic trading does not have, with respect to the transaction, a speed-based advantage over the one or more additional devices that are not configured for high-speed algorithmic trading.

2. The method of claim 1, wherein the best-priced matching order is the first matching order received from the first device.

3. The method of claim 1, wherein the best-priced matching order is not the first matching order received from the first device.

4. The method of claim 1, wherein the exchange computer system is a distributed computer system comprising an order routing system, an order matching system, and an auction engine;
wherein the security transaction order that includes the auction request is received by the order routing system;
wherein the order routing system forwards the security transaction order to the order matching system;
wherein the first matching order that includes the request for participation in the auction is received by the order routing system;
wherein the order routing system forwards the first matching order to the order matching system;
wherein the order matching system determines that the first matching order matches the security transaction order;
wherein the auction engine initiates the delay timer that runs for the first randomized period of time in response to the determination that the first matching order matches the security transaction order;
wherein the auction engine notifies the plurality of market participants of the auction in response to the determination that the first randomized period of time has expired; and wherein the order matching system facilitates the transaction based on the security transaction order in response to the determination that the second period of time has expired.

5. The method claim 1, wherein the delay timer that runs for a first randomized period of time is initiated in response to receiving the first matching order.

6. The method of claim 1, further comprising:
determining a length of the first randomized period of time based on a pseudorandom process.

7. The method of claim 1, wherein notifying the plurality of market participants of the auction comprises:
generating a message inviting each of the plurality of market participants to participate in the auction, wherein the message includes information enabling each of the plurality of market participants to affirmatively indicate that a matching order should be included in the auction; and
sending the message to each of the plurality of market participants.

8. The method of claim 1, further comprising:
determining a length of the first randomized period of time based on one or more parameters associated with the security transaction order.

9. The method of claim 1, further comprising:
determining a length of the first randomized period of time based on one or more parameters associated with the first matching order.

10. The method of claim 1, further comprising:
receiving, during the first randomized period of time, one or more supplemental matching orders.

11. The method of claim 1, wherein notifying the plurality of market participants of an auction comprises providing the plurality of market participants with information regarding the security transaction order, the first matching order, and the one or more supplemental matching orders.

12. The method of claim 1, wherein the exchange computer system is a distributed computer system comprising:
an order routing system; and
an order matching system comprising an auction engine.

13. An exchange computer system configured to minimize technological advantages possessed by some market participants over others by deemphasizing importance of order entry speed in trading, the exchange computer system comprising:
one or more processors; and
one or more memory elements including instructions that, when executed, cause the one or more processors to perform operations including:
receiving, from a user device, a security transaction order;
receiving a first matching order from a first device, wherein the first device is configured for high-speed algorithmic trading;
determining a first randomized period of time for a delay timer based on a signal obtained by the exchange computer system;
initiating the delay timer that runs for the first randomized period of time;
determining that the first randomized period of time has expired;
responsive to determining that the first randomized period of time has expired, initiating (i) an auction associated with the security transaction order and the first matching order and (ii) an auction timer that limits the auction to run for a second period of time;
notifying a plurality of market participants of the auction;
receiving, during the second period of time, one or more additional matching orders from one or more additional devices, wherein each of the one or more additional matching orders includes a request for participation in the auction, and wherein each of the one or more additional devices are not configured for high-speed algorithmic trading;
determining that the second period of time has expired;
determining a price of the first matching order;
determining a price of each of the one or more additional matching orders received during the second period of time;
determining a best-priced matching order based on the price of the first matching order and the price of each of the one or more additional matching orders; and
facilitating, by the one or more processors, a transaction based on the security transaction order and the best-priced matching order, thereby ensuring that the security transaction order trades with the best-priced matching order, and that the first device that is configured for high-speed algorithmic trading does not have, with respect to the transaction, a speed-based advantage over the one or more additional devices that are not configured for high-speed algorithmic trading.

14. The exchange computer system of claim 13, wherein the best-priced matching order is the first matching order received from the first device.

15. The exchange computer system of claim 13, wherein the best-priced matching order is not the first matching order received from the first device.

16. A non-transitory storage medium encoded with instructions configured to minimize technological advantages possessed by some market participants over others by deemphasizing importance of order entry speed in trading, wherein the instructions, when executed by an exchange computer system, cause the exchange computer system to perform operations comprising:
receiving, from a user device, a security transaction order;
receiving a first matching order from a first device, wherein the first device is configured for high-speed algorithmic trading;
determining a first randomized period of time for a delay timer based on a signal obtained by the exchange computer system;
initiating the delay timer that runs for the first randomized period of time;
determining that the first randomized period of time has expired;
responsive to determining that the first randomized period of time has expired, initiating (i) an auction associated with the security transaction order and the first matching order and (ii) an auction timer that limits the auction to run for a second period of time;
notifying a plurality of market participants of the auction;
receiving, during the second period of time, one or more additional matching orders from one or more additional devices, wherein each of the one or more additional matching orders includes a request for participation in the auction, and wherein each of the one or more additional devices are not configured for high-speed algorithmic trading;
determining that the second period of time has expired;
determining a price of the first matching order;

determining a price of each of the one or more additional matching orders received during the second period of time;

determining a best-priced matching order based on the price of the first matching order and the price of each of the one or more additional matching orders; and facilitating, by one or more processors, a transaction based on the security transaction order and the best-priced matching order, thereby ensuring that the security transaction order trades with the best-priced matching order, and that the first device that is configured for high-speed algorithmic trading does not have, with respect to the transaction, a speed-based advantage over the one or more additional devices that are not configured for high-speed algorithmic trading.

17. The non-transitory storage medium of claim 16, wherein the best-priced matching order is the first matching order received from the first device.

18. The non-transitory storage medium of claim 16, wherein the best-priced matching order is not the first matching order received from the first device.

19. The non-transitory storage medium of claim 16, wherein the security transaction order includes an auction request.

20. The non-transitory storage medium of claim 16, wherein the delay timer that runs for the first randomized period of time is initiated in response to receiving the first matching order.

* * * * *

UNITED STATES PATENT AND TRADEMARK OFFICE
CERTIFICATE OF CORRECTION

PATENT NO. : 11,900,459 B2
APPLICATION NO. : 18/161319
DATED : February 13, 2024
INVENTOR(S) : Adam Inzirillo and William Ciabattoni It is certified that error appears in the above-identified patent and that said Letters Patent is hereby corrected as shown below:

In the Claims

Column 11, Line 5, Claim 5, after "method" insert -- of --

Signed and Sealed this
Ninth Day of April, 2024

*Katherine Kelly Vidal*

Katherine Kelly Vidal
*Director of the United States Patent and Trademark Office*